United States Patent
Lunden et al.

(10) Patent No.: US 10,512,102 B2
(45) Date of Patent: Dec. 17, 2019

(54) METHOD AND APPARATUS FOR TRIGGERING AN ACTIVE TIME TO MONITOR FOR DISCONTINUOUS RECEPTION

(71) Applicant: NOKIA TECHNOLOGIES OY, Espoo (FI)

(72) Inventors: Petteri Lunden, Espoo (FI); Esa Malkamaki, Espoo (FI); Elena Virtej, Espoo (FI); Chunli Wu, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 15/776,111

(22) PCT Filed: Nov. 15, 2016

(86) PCT No.: PCT/FI2016/050801
§ 371 (c)(1),
(2) Date: May 15, 2018

(87) PCT Pub. No.: WO2017/085358
PCT Pub. Date: May 26, 2017

(65) Prior Publication Data
US 2018/0324847 A1    Nov. 8, 2018

Related U.S. Application Data

(60) Provisional application No. 62/255,759, filed on Nov. 16, 2015.

(51) Int. Cl.
*H04W 72/14*    (2009.01)
*H04W 72/04*    (2009.01)
*H04W 76/28*    (2018.01)
*H04W 76/27*    (2018.01)
*H04W 28/02*    (2009.01)

(52) U.S. Cl.
CPC .......... *H04W 72/14* (2013.01); *H04W 76/27* (2018.02); *H04W 76/28* (2018.02); *H04W 28/0278* (2013.01)

(58) Field of Classification Search
CPC ............ H04W 72/042; H04W 72/0413; H04L 1/1854; H04L 5/0053; H04L 5/0055
See application file for complete search history.

(56) References Cited

U.S. PATENT DOCUMENTS 10,064,168 B2 *   8/2018   Yang ..................... H04L 1/1854
2015/0188670 A1   7/2015   Lee et al.

OTHER PUBLICATIONS

International Search Report & Written Opinion dated Feb. 24, 2017 corresponding to International Patent Appplication No. PCT/FI2016/050801.

(Continued)

*Primary Examiner* — Chandrahas B Patel
(74) *Attorney, Agent, or Firm* — Squire Patton Boggs (US) LLP

(57) ABSTRACT

A method and apparatus may include transmitting uplink communication via an uplink semi-persistent scheduling resource. The method may also include monitoring a control channel for downlink communication. The monitoring comprises monitoring for discontinuous reception. The monitoring is triggered by the transmitting of the uplink communication.

20 Claims, 7 Drawing Sheets

(56) References Cited

OTHER PUBLICATIONS

Ericsson: "Areas for latency reduction", 3GPP TSG-RAN WG2 #91; Beijing P.R. China, Aug. 24-28, 2015; R2-153489, pp. 1-7.
Nokia Networks: "Potential protocol enhancement for Fast uplink access", 3GPP TSG-RAN WG2 Meeting #91bis; Malmo, Sweden, Oct. 5-9, 2015; R2-154491, 3 pgs.
Nov. 29, 2018 Office Action issued in Thailand Patent Application No. 1801002286.

* cited by examiner

METHOD AND APPARATUS FOR TRIGGERING AN ACTIVE TIME TO MONITOR FOR DISCONTINUOUS RECEPTION

CROSS REFERENCE TO RELATED APPLICATION

This application is a national phase of PCT International Application No. PCT/FI2016/050801 filed on Nov. 15, 2016, and which claims priority to U.S. Provisional Patent Application No. 62/255,759 filed on Nov. 16, 2015. The entire content of all of the above referenced applications are hereby incorporated by reference.

BACKGROUND

Field

Certain embodiments of the present invention may relate to latency reduction, associated with semi-persistent uplink scheduling.

Description of the Related Art

Long-term Evolution (LTE) is a standard for wireless communication that seeks to provide improved speed and capacity for wireless communications by using new modulation/signal processing techniques. The standard was proposed by the 3$^{rd}$ Generation Partnership Project (3GPP), and is based upon previous network technologies. Since its inception, LTE has seen extensive deployment in a wide variety of contexts involving the communication of data.

Different methods are used for user equipment (UE) uplink (UL) scheduling. In case of dynamic UL scheduling, when the UE needs to send data in the uplink, it will send a scheduling request (SR) to an evolved Node B (eNB). The eNB will allocate resources to the UE and inform the UE through a Physical Downlink Control Channel (PDCCH channel). In certain situations, it can be more beneficial to use semi-persistent scheduling (SPS). For example, if the amount of UL resources needed is not too high and/or the resources are needed in a known periodic pattern, scheduling can be done at once by the eNB, and the UE can use these resources instead of requesting resources for each transmission time interval (TTI), and therefore reducing control plan overhead. An example case where SPS is useful is the voice-over-IP (VoIP) use case, where adaptive multi-rate (AMR) codec provides packets once per 20 ms during active period. In this case, SPS with 20 ms periodicity can be used.

Up to now, a minimum SPS periodicity, as defined in the specifications, has been 10 ms. However, recently, in the context of latency reduction, an SPS periodicity of 1 TTI has been introduced, which is useful for configuring UE with an UL SPS for latency reduction purposes, as there is no need to send SR before transmitting the data (or transmitting a buffer status report (BSR)) directly using the persistently configured UL grant.

BRIEF DESCRIPTION OF THE DRAWINGS

For proper understanding of the invention, reference should be made to the accompanying drawings, wherein.

DETAILED DESCRIPTION

Certain embodiments of the present invention relate to using SPS for UE UL transmissions for latency reduction purposes.

Certain embodiments of the present invention relate to triggering an active time to monitor for discontinuous reception.

Certain embodiments of the present invention may relate to 3GPP latency reduction study item RP-150465, entitled "SI: Study on Latency reduction techniques for LTE." According to RAN2#91, an Uplink (UL) Semi-Persistent Scheduling (SPS) grant may have a periodicity of 1 Transmission Time Interval (TTI). The UL SPS grant with the 1 TTI periodicity may be used for configuring a UE to reduce latency. When using a semi-persistently-configured UL grant, there is generally no need to send a Scheduling Request (SR) before transmitting data (or before transmitting a Buffer Status Report (BSR)).

With the previous approaches, it is assumed that a typical UL SPS periodicity (with a duration of 20 ms, for example) will align with a Discontinuous Reception (DRX) On-Duration. However, when using an UL SPS with a periodicity of 1 ms, it is generally impossible to align this UL SPS with an On-Duration, unless a 1 ms DRX cycle is utilized, which means that no DRX is used at all.

It may be beneficial to allow a UE to perform transmissions using an UL SPS grant during DRX sleep so that DRX configuration can be independent from SPS configuration. Such an approach may be beneficial, for example, in the case of short SPS periodicity, such as 1 TTI SPS periodicity, when it is impossible to align UL SPS with DRX On Duration.

By configuring DRX to be independent from SPS configuration, more sleeping time may be provided to the UE when there is nothing to be transmitted by the UE, but the network may not be able to promptly provide the UE with communication on the Physical Downlink Control Channel (PDCCH). Specifically, the network may not be able to reach the UE, except during the Transmission Time Interval (TTI) when the UE monitors PDCCH for retransmissions.

In response to traffic that the UE has transmitted in the uplink, the UE may possibly receive some subsequent response in the Downlink (DL). For example, if the UE sends a HTTP GET request to a server in the UL, the UE will likely receive a webpage in response, in the DL.

Figure 1:
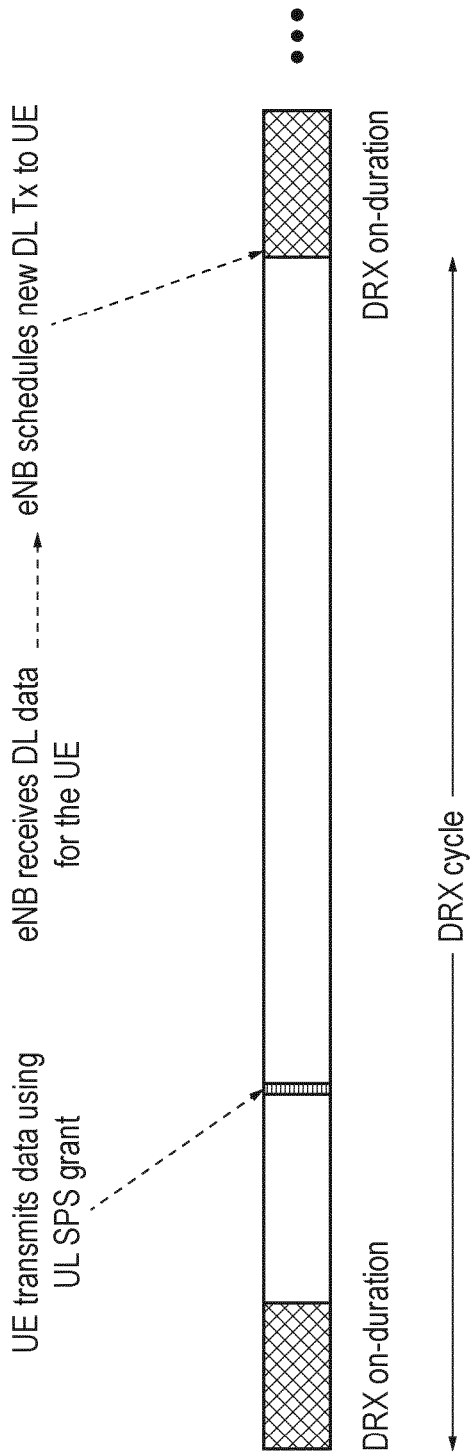
FIG. 1 illustrates using discontinuous reception in accordance with the previous approaches.

However, when using DRX in conjunction with the previous approaches, a problem may exist in that the DL traffic may need to wait until the next DRX on-duration in order for the traffic to be successfully received by the UE, because the UE may not be monitoring PDCCH. This need to wait until the next DRX on-duration may potentially cause additional latency on the order of tens of milliseconds or more. FIG. 1 illustrates using discontinuous reception in accordance with the previous approaches.

In case of dynamic scheduling, a Scheduling Request (SR) transmission will bring the UE to active time, and an UL grant for UL data transmission restarts the inactivity timer. Restarting the inactivity timer extends the active time to allow further DL scheduling.

With the SPS approach, and a UL SPS grant of 1 ms periodicity (or in other words, UL SPS grant in every TTI), the SR will not be necessary because the UE can already use the SPS resource for UL transmission, and then the UE remains sleeping after the UL SPS transmission, and the DL cannot be scheduled with a short latency.

One reason for introducing 1 TTI SPS is to reduce latency, to avoid the SR overhead. However, the benefit of this approach will be lost if the DL response on the UL transmission will need to wait until a next DRX ON duration.

One way to overcome the above problem is to use existing DRX principles and operations and to optimize the parameters for UE if the delay sensitive service needs to be supported. For example, a shorter DRX cycle can be configured for latency reduction. However, with 1 TTI UL SPS periodicity, the target is to achieve reasonable latency reduction compared to using SR based UL, and, therefore, to keep the expected latency reduction, a very short DRX cycle would need to be used. The latter will however mean an increased power consumption.

Another way to overcome the above problem is using HARQ retransmission occasions. This is, however, a very limited opportunity. In addition, in most cases, this opportunity occurs too soon after the UL transmission than would be needed most of the situations. The reason for the latter is the delay between eNB and the web server or the end point of the traffic.

Yet another way to overcome the above problem is not to use the DRX at all during the SPS use cases that are meant for latency reduction, however, this will obviously result in an increased power consumption. To reduce power consumption, the network would need to release UE connection aggressively. In this case, the transition between idle and connected mode will be very slow, such that it will not fit within the latency reduction concept.

Certain DRX operations are specified in 3GPP Technical Specification 36.321 (section 5.7). DRX may be configured using Radio Resource Control (RRC) signalling (in accordance with Technical Specification 36.331, for example).

Currently, DRX may mandate when the UE is required to monitor PDCCH. The time period when the UE is required to monitor PDCCH may be referred to as the Active Time. DRX may operate based on rules and timers which, in turn, control when the UE is required to monitor the downlink control channel. When the UE is not required to monitor the control channel, the UE can power off its receiver and may conserve energy. At the same time, an evolved Node B (eNB) may know the DRX state of the UE (as the eNB may have similar rules and timers), and the eNB may thus know when the UE is monitoring/listening to a control channel for new allocations.

Referring to 3GPP Technical Specification 36.321 (Section 5.7), with regard to Discontinuous Reception (DRX):

during the Active Time, for a PDCCH-subframe, if the subframe is not required for uplink transmission for half-duplex FDD UE operation, if the subframe is not a half-duplex guard subframe [7] and if the subframe is not part of a configured measurement gap; or during the Active Time, for a subframe other than a PDCCH-subframe and for a UE capable of simultaneous reception and transmission in the aggregated cells, if the subframe is a downlink subframe indicated by a valid eIMTA L1 signalling for at least one serving cell not configured with schedulingCellId [8] and if the subframe is not part of a configured measurement gap; or during the Active Time, for a subframe other than a PDCCH-subframe and for a UE not capable of simultaneous reception and transmission in the aggregated cells, if the subframe is a downlink subframe indicated by a valid eIMTA L1 signalling for the SpCell and if the subframe is not part of a configured measurement gap:
monitor the PDCCH;
if the PDCCH indicates a DL transmission or if a DL assignment has been configured for this subframe:
start the HARQ RTT Timer for the corresponding HARQ process;
stop the drx-RetransmissionTimer for the corresponding HARQ process.
if the PDCCH indicates a new transmission (DL, UL or SL):
start or restart drx-InactivityTimer.

An evolved Node B (eNB) may schedule the UE during the active time, and the PDCCH for a new transmission may restart the inactivity timer, which extends the active time for the eNB to schedule the UE further.

Certain embodiments of the present invention are directed to changes to DRX that improve DRX, from a latency point of view. DRX inherently trades increased latency for lower UE energy consumption. On the other hand, if UL semi-persistent scheduling (SPS) (e.g. with a periodicity of 1 TTI) is utilized for reducing latency, then DRX and UL semi-persistent scheduling may have conflicting objectives. However, certain embodiments are directed to achieving a configuration that makes the best use out of both DRX and UL semi-persistent scheduling with short SPS periodicity.

Certain embodiments may be directed to a UE that is configured by an eNB with both (1) a semi-persistent grant in UL, and (2) DRX. When the UE has communication to transmit in UL, the UE uses an UL SPS resource/grant in a subframe. The UE uses the semi-persistent grant to transmit in UL, regardless of whether the UE is in active time or not.

Next, the UE may start monitoring a downlink control channel for new allocations for a pre-configured time period. For example, the UE may restart/start an inactivity timer upon UL transmission on the SPS resource as if a new transmission scheduling is received on PDCCH. As such, when, for example, the UE's UL traffic transmits an HTTP GET request, or when the UL traffic results in an action that requests feedback on the DL, the UE will more likely be monitoring the DL control channel when the feedback arrives on the DL. Therefore, because the UE is more likely monitoring the DL control when the feedback arrives, the user will generally experience shorter periods of latency.

In certain embodiments, DL control channel monitoring by the UE may be started, when the UE uses the UL SPS grant, and only if the UE has transmitted data in the UL. For example, if the UE just transmits control signaling such as an empty Buffer Status Report (BSR) or Power Headroom Report (PHR), then the UE does not necessarily start the DL control channel monitoring. In some embodiments, transmitting of an empty BSR may stop the activity and may start the DRX sleep time.

Certain embodiments may configure a UE with a new parameter by using Radio Resource Control (RRC) signalling. The new parameter may indicate a duration for which the UE should stay awake (i.e., monitoring DL control channel) after the UE uses an UL SPS grant. The duration can correspond to a duration of time for which the UE should stay awake to monitor a DL control channel, for example. In certain embodiments, the new parameter may be enabled based upon whether or not the parameter is configured with a value. As such, in certain embodiments, if the parameter is not configured with a value, the network may decide to not use the parameter. The UE and the eNB may operate in accordance with the same rules, so that both the eNB and the UE have the same understanding regarding whether the UE needs to monitor the downlink control channel in a given subframe.

Figure 2:
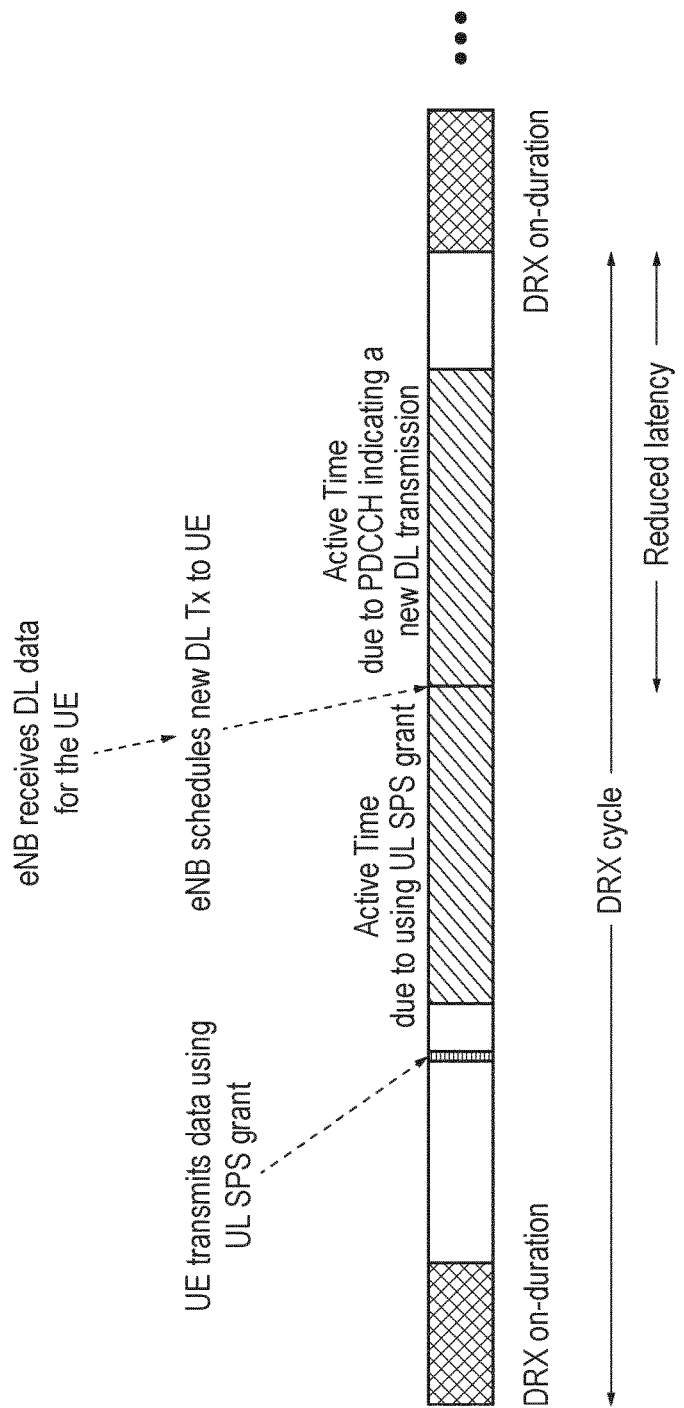
FIG. 2 illustrates using discontinuous reception in accordance with certain embodiments.

FIG. 2 illustrates an example of using discontinuous reception in accordance with certain embodiments. In certain embodiments, upon transmission of an UL transmission by the UE, a response to the UE's UL transmission is generally not provided immediately. The response may be delayed. For example, the delay experienced by a response may be based on, for example, the specific route between the eNB and the server. As such, because a response to the UE'S UL transmission is generally not provided to the UE immediately, the time period during which the UE should be awake after using the UL SPS grant does not need to commence immediately after the UL communication. The time period during which the UE should be awake may start, for example, several ms (such as 4 ms, for example) after the UE uses the UL SPS grant. The time period (during which the UE should be awake) may then last for some pre-configured amount of time (such as for 10-50 ms, for example). The duration between using the UL SPS grant and when the UE should start being awake may be determined based on a minimum round trip time of the system (such as, for example, 4 ms or 4 TTIs), but the duration could also be longer. The duration for which the UE should be awake may be determined based on at least one of an expected eNB processing delay, a DL scheduling delay, and/or a core network delay. The duration may also be configured based on some added time to provide an additional margin of safety/flexibility (depending on the desired trade-off between latency reduction and UE energy consumption). As such, as described above, the UE may be awake for 10-50 ms, for example.

According to certain embodiments, one option for configuring the UE to monitor the DL control channel (PDCCH) for a pre-determined duration may utilize the already-specified DRX inactivity timer. Specifically, the already-specified DRX inactivity timer may be started when the UE uses the UL SPS grant for transmitting or, more specifically, for transmitting data in UL. A time period indicated by the DRX inactivity timer may correspond to the time period for which the UE monitors the DL control channel Whether the DRX inactivity timer is started or not, at the time when the UE transmits data using the UL SPS grant, can also be configurable, e.g., by RRC signalling. Depending on the traffic the UE has, the network can decide whether to configure this functionality or not. For example in the case of Voice-over-IP (VoIP) traffic, the network may opt not to configure it, as it is expected that UE uses UL SPS frequently to transmit data without expecting an immediate response in DL, whereas, for web browsing, it would be beneficial to start the DL monitoring after the UE uses UL SPS to transmit data.

In one embodiment, the following new trigger may be used for starting or re-starting the already specified inactivity timer. When DRX is configured, the MAC entity shall, for each subframe, do following:
    if an UL grant has been configured for this subframe, and
        if UE has data to transmit, then start or restart drx-InactivityTimer.

In certain embodiments, the above feature is configurable. It can be enabled only when it makes sense, e.g., when SPS is used for latency reduction purposes (for example, with 1 TTI SPS), and otherwise it would not be enabled (e.g., in VoIP use case).

Other embodiments may define a new timer for the purpose of configuring the UE to monitor the DL control channel for the predetermined duration. The eNB can configure a new timer using RRC signalling (as described above), and certain embodiments may disable the new timer if the new timer is not needed (such as in the case of transmitting Voice-over-IP (VoIP) traffic). By using this separate new timer, certain embodiments may configure the UE for monitoring the DL control channel, and the new timer may be used without affecting the legacy DRX parameters or behaviour.

In certain embodiments, after the UE uses the UL SPS grant, a short period (such as, for example, a period of 4 TTIs) may be provided before starting the timer. As described above, the short period may be provided because communication on the DL (responsive to the UL SPS grant) may be delayed. This short period may be provided by using another timer, which may be similar to a HARQ_RTT timer. In other words, the time period for monitoring of DL control may not start immediately after the UL SPS resource is used by the UE, but rather may start after another pre-configured time period. Starting the monitoring of DL control after the pre-configured time period may be beneficial because the eNB may not be able to transmit anything immediately, and there may be some processing time that is similar, for example, to a HARQ Ack/Nack delay. Alternatively, the UE may start the timer only when receiving HARQ Ack/Nack for the UL SPS transmission. The UE may need to read the PDCCH anyway in this TTI (where HARQ Ack/Nack is received), according to the current specification.

In one embodiment, use of the UL SPS grant by the UE may start a short DRX cycle (as currently specified or as a new similar PDCCH monitoring pattern that is configured for this purpose). This embodiment may have the benefit where the UE can be reached faster in DL after using the UL SPS grant.

One reason why this enhancement may be useful is that the UL SPS may be of a short periodicity (of even 1 TTI, for example), instead of using SR, to initiate the UL traffic. With the previous approaches of using SR to initiate the UL traffic, the UE starts a DRX inactivity timer when the UE is scheduled in UL. The UE may then start a subsequently short DRX cycle, if the short DRX cycle is configured. However, in this case, because there is no new UL grant given on the PDCCH, the UE does not start the DRX inactivity timer and may potentially end up experiencing significantly increased latency. Experiencing significantly increased latency goes against the reason why the 1 TTI periodicity for UL SPS is introduced in the first place.

In view of the above, according to certain embodiments, when DRX is configured, a Medium Access Control (MAC) entity may, for each subframe, start or restart drx-InactivityTimer, if an UL grant has been configured for this subframe and if the UE has data to transmit.

Certain embodiments of the present invention may be applied to the case when SPS is used for latency reduction, i.e., with short SPS periodicity such as an SPS periodicity of 1 ms, but not applied in events such as, for example, when 20 ms/40 ms periodicity is used for VoIP. In this case, UL transmission on the SPS resource does not need to restart the inactivity timer.

It should be understood that latency reduction may be desired also in other cases where SPS is used (i.e. any values of SPS periodicity), and not particularly in the case of an SPS with 1 ms periodicity. The teachings of the present invention are thus not restricted to 1 TTI SPS and are valid for all SPS use cases where latency reduction is desired.

As described above, in certain embodiments of the present invention, new timers may be used. Using new timers may require some additional changes to manage them, but the changes may configure the timers without any impact on legacy DRX behaviour. Also, in certain embodiments, instead of starting an inactivity timer, the UE may enter a short DRX cycle. Certain embodiments do not start/restart the inactivity timer immediately, but rather after N TTIs.

In view of the above, certain embodiments of the present invention may support using DRX together with UL SPS, where the UL SPS may even have a periodicity of 1 TTI (though other periodicities may also be used). According to certain embodiments, there may be a reduced latency for a typical traffic pattern, where the user directly perceives the additional delay. The user may interact with a user device, may send a request in UL, and may receive a response in DL. Certain embodiments may reduce latency without compromising UE power consumption.

In certain embodiments of the present invention, the UL SPS can be used during DRX ON-duration. In this case also, all the teachings of the present invention can be applied. For example, while the UE sends the UL data during the DRX ON duration, the DL monitoring by the UE does not need to wait for the next DRX ON duration and may be started, when the UE uses the UL SPS grant. The latter can be achieved by introducing new triggers for starting drx-InactivityTimer, using short DRX cycle, or introducing a new timer.

Figure 3:
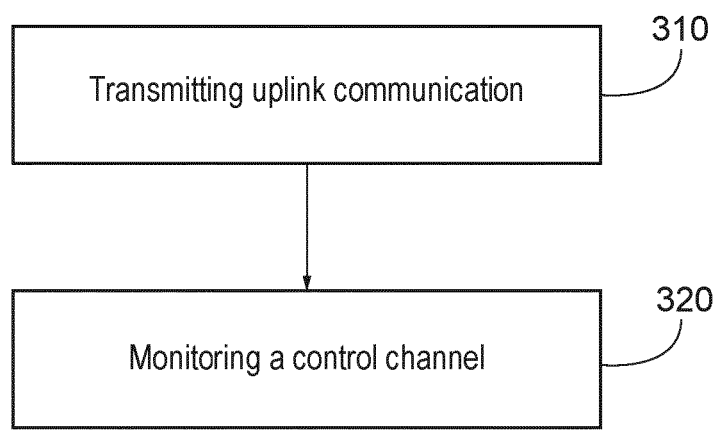
FIG. 3 illustrates an example flowchart of a method in accordance with certain embodiments of the invention.

FIG. 3 illustrates an example flowchart of a method, according to one embodiment. The method of FIG. 3 may be performed by a user equipment such as a mobile device, portable computing device, tablet device, hand-held phone, laptop computer, and/or any device that is used by a user to communicate. The method illustrated in FIG. 3 includes, at 310, transmitting uplink communication via an uplink semi-persistent scheduling resource. The method may also include, at 320, monitoring a control channel for downlink communication. The monitoring may comprise monitoring for discontinuous reception. The monitoring may be triggered by the transmitting of the uplink communication.

Figure 4:
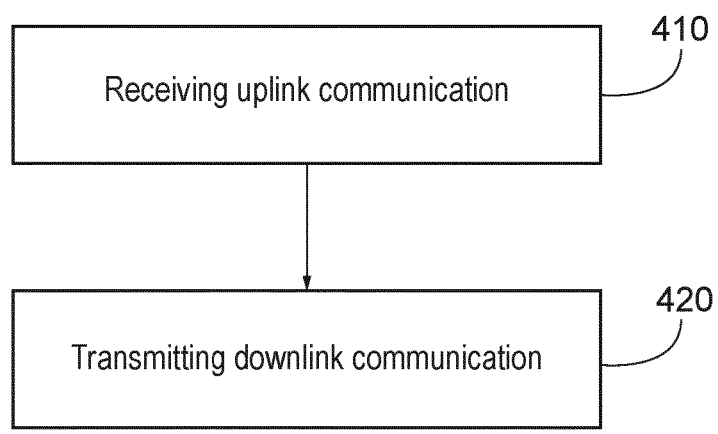
FIG. 4 illustrates an example flowchart of a method in accordance with certain embodiments of the invention.

FIG. 4 illustrates an example flowchart of a method, according to another embodiment. The method of FIG. 4 may be performed by a network node such as, for example, a base station, an access point, an eNB, a network server, and/or any other device that enables network communication. The method illustrated in FIG. 4 includes, at 410, receiving, by a network node, uplink communication via an uplink semi-persistent scheduling resource from a user equipment. The method also includes, at 420, transmitting downlink communication on a control channel to the user equipment. The control channel is monitored by the user equipment for discontinuous reception, and the transmitting is triggered by the receiving of the uplink communication.

Figure 5:
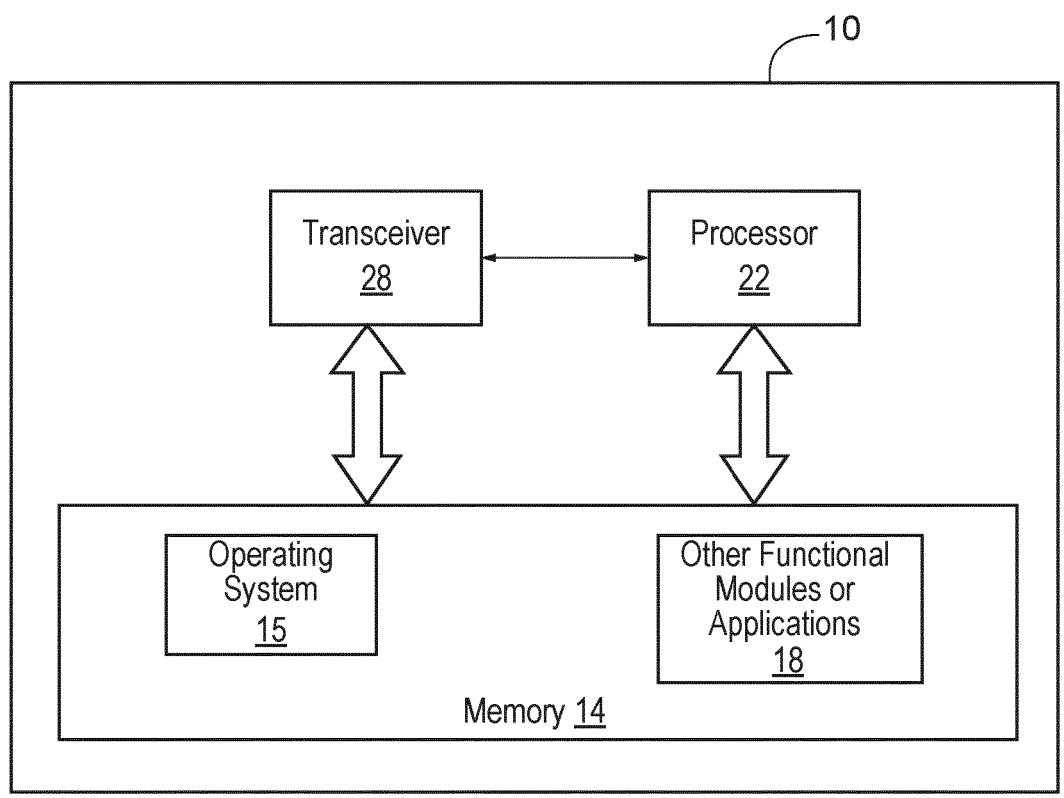
FIG. 5 illustrates an apparatus in accordance with certain embodiments of the invention.

FIG. 5 illustrates an apparatus in accordance with certain embodiments of the invention. In one embodiment, the apparatus can be a base station and/or an evolved Node B, for example. In another embodiment, the apparatus may be a UE, for example. Apparatus 10 can include a processor 22 for processing information and executing instructions or operations. Processor 22 can be any type of general or specific purpose processor. While a single processor 22 is shown in FIG. 5, multiple processors can be utilized according to other embodiments. Processor 22 can also include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further include a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 include any combination of random access memory (RAM), read only memory (ROM), static storage such as a magnetic or optical disk, or any other type of non-transitory machine or computer readable media. The instructions stored in memory 14 can include program instructions or computer program code that, when executed by processor 22, enable the apparatus 10 to perform tasks as described herein.

Apparatus 10 can also include one or more antennas (not shown) for transmitting and receiving signals and/or data to and from apparatus 10. Apparatus 10 can further include a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 can store software modules that provide functionality when executed by processor 22. The modules can include an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

In one embodiment, apparatus 10 of FIG. 5 may be configured to transmit uplink communication via an uplink semi-persistent scheduling resource. Apparatus 10 may also be configured to monitor a control channel for downlink communication. The monitoring may comprise monitoring for discontinuous reception. The monitoring may be triggered by the transmitting of the uplink communication.

In another embodiment, apparatus 10 of FIG. 5 may be configured to receive uplink communication via an uplink semi-persistent scheduling resource from a user equipment. Apparatus 10 may also be configured to transmit downlink communication on a control channel to the user equipment. The control channel is monitored by the user equipment for discontinuous reception, and the transmitting is triggered by the receiving of the uplink communication.

Figure 6:
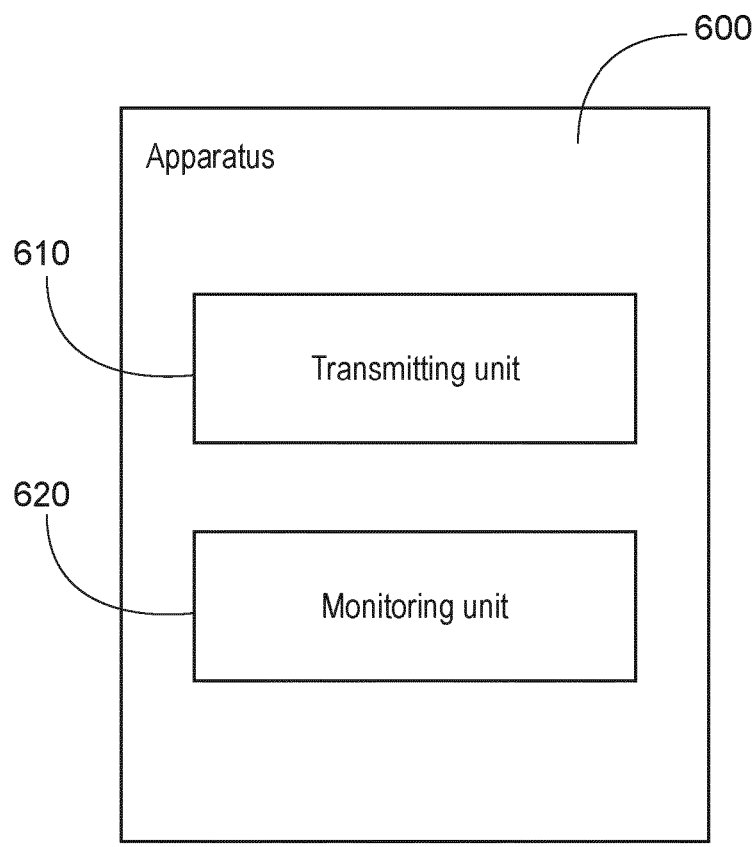
FIG. 6 illustrates an apparatus in accordance with certain embodiments of the invention.

FIG. 6 illustrates an apparatus in accordance with certain embodiments of the invention. Apparatus 600 can be a user equipment, for example. Apparatus 600 can include a transmitting unit 610 that transmits uplink communication via an uplink semi-persistent scheduling resource. Apparatus 600 may also include a monitoring unit 620 that monitors a control channel for downlink communication. The monitoring comprises monitoring for discontinuous reception. The monitoring may be triggered by the transmitting of the uplink communication.

Figure 7:
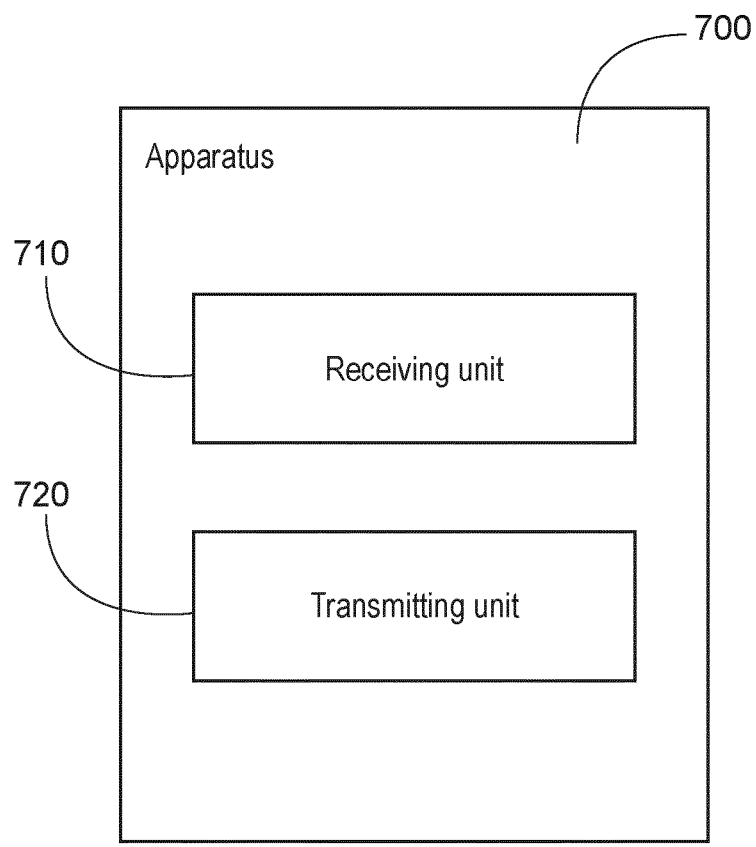
FIG. 7 illustrates an apparatus in accordance with certain embodiments of the invention.

FIG. 7 illustrates an apparatus in accordance with certain embodiments of the invention. Apparatus 700 can be a base station and/or an eNB, for example. Apparatus 700 can include a receiving unit 710 that receives uplink communication via an uplink semi-persistent scheduling resource from a user equipment. Apparatus 700 may also include a transmitting unit 720 that transmits downlink communication on a control channel to the user equipment. The control channel is monitored by the user equipment for discontinuous reception. The transmitting is triggered by the receiving of the uplink communication.

In certain embodiments, a computer program product may be embodied on the non-transitory computer readable medium of apparatus 10. The computer program product may be configured to control processor 22 to perform transmitting uplink communication via an uplink semi-persistent scheduling resource. The computer program product may also be configured to control processor 22 to monitor a control channel for downlink communication. The monitoring may include monitoring for discontinuous reception. The monitoring may be triggered by the transmitting of the uplink communication.

In other embodiments, a computer program product may be embodied on the non-transitory computer readable medium of apparatus 10. The computer program product may be configured to control processor 22 to perform receiving uplink communication via an uplink semi-persistent scheduling resource from a user equipment. The computer program product may also configure processor 22 to transmit downlink communication on a control channel to the user equipment. The control channel may be monitored by the user equipment for discontinuous reception. The transmitting may be triggered by the receiving of the uplink communication.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
   transmitting, by a user device, uplink communication via an uplink semi-persistent scheduling resource; and
   monitoring a control channel for downlink communication, wherein the monitoring comprises monitoring for discontinuous reception, and the monitoring is triggered by the transmitting of the uplink communication.

2. The method according to claim 1, wherein the monitoring comprises monitoring a physical downlink control channel.

3. The method of claim 1, wherein the transmitting of the uplink communication may happen outside of active time.

4. The method according to claim 1, wherein the transmitting the uplink communication comprises at least one of:
   transmitting using an uplink semi-persistent scheduling grant; or
   transmitting regardless of whether the user device is in active time or not.

5. The method according to claim 1, wherein the monitoring comprises at least one of:
   start monitoring the control channel after a determined first time period, and the first time period is configured via radio-resource control signalling.

6. The method according to claim 1, wherein the monitoring comprises monitoring the control channel after a determined second time period has elapsed after transmission of the uplink semi-persistent scheduling resource.

7. The method according to claim 1, wherein whether to monitor the control channel for the determined period upon transmitting using an uplink semi-persistent scheduling grant is configured via radio-resource control signaling.

8. An apparatus, comprising:
   at least one processor; and
   at least one memory including computer program code,
   the at least one memory and the computer program code configured, with the at least one processor, to cause the apparatus at least to
   transmit uplink communication via an uplink semi-persistent scheduling resource; and
   monitor a control channel for downlink communication, wherein the monitoring comprises monitoring for discontinuous reception, and the monitoring is triggered by the transmitting of the uplink communication.

9. The apparatus according to claim 8, wherein the monitoring comprises monitoring a physical downlink control channel.

10. The apparatus according to claim 8, wherein the monitoring may happen outside DRX on-duration period.

11. The apparatus according to claim 8, wherein the transmitting the uplink communication comprises at least one of:
    transmitting using an uplink semi-persistent scheduling grant; or
    transmitting regardless of whether the user device is in active time or not.

12. The apparatus according to claim 8, wherein the monitoring comprises at least one of:
    monitoring the control channel for a determined first time period, and the first time period is configured via radio-resource control signalling.

13. The apparatus according to claim 8, wherein the monitoring comprises monitoring the control channel after a determined second time period has elapsed after transmission of the uplink semi-persistent scheduling resource.

14. The apparatus according to claim 8, wherein whether to monitor the control channel for the determined period upon transmitting using an uplink semi-persistent scheduling grant is configured via radio-resource control signaling.

15. An apparatus, comprising:
    at least one processor; and
    at least one memory including computer program code,
    the at least one memory and the computer program code configured, with the at least one processor, to cause the apparatus at least to
    receive uplink communication via an uplink semi-persistent scheduling resource from a user equipment; and transmit downlink communication on a control channel to the user equipment, wherein the control channel is monitored by the user equipment for discontinuous reception, and the transmitting is triggered by the receiving of the uplink communication.

16. The apparatus according to claim 15, wherein the transmitting comprises transmitting downlink communication on a physical downlink control channel.

17. The apparatus according to claim 15, wherein the transmitting may happen outside DRX on-duration period.

18. The apparatus according to claim 15, wherein the receiving the uplink communication comprises receiving via an uplink semi-persistent scheduling grant.

19. The apparatus according to claim 15, wherein the receiving the uplink communication comprises receiving via an uplink semi-persistent scheduling grant, and the uplink semi-persistent scheduling grant has a periodicity of 1 transmission time interval.

20. The apparatus according to claim 15, wherein the uplink communication comprises transmitting regardless of whether the user device is an active time or not.

* * * * *